United States Patent [19]

Topcik

[11] 3,787,221

[45] Jan. 22, 1974

[54] PELLETS OF PRECIPITATED SILICA

[75] Inventor: Barry Topcik, Somerville, N.J.

[73] Assignee: Cities Service Company, New York, N.Y.

[22] Filed: July 9, 1971

[21] Appl. No.: 161,944

Related U.S. Application Data

[62] Division of Ser. No. 887,403, Dec. 22, 1969, Pat. No. 3,646,183.

[52] U.S. Cl. ...... 106/288 B, 106/308 Q, 106/308 N

[51] Int. Cl. .... C08h 17/02, C08j 1/118, C09c 1/28

[58] Field of Search .................... 106/288 B, 308 Q

[56] References Cited

UNITED STATES PATENTS 3,258,311 6/1966 Burzynski et al. .................... 23/182

3,223,482 12/1965 Puddington et al. ............ 106/288 B

*Primary Examiner*—James E. Poer
*Assistant Examiner*—S. Berger
*Attorney, Agent, or Firm*—Elton F. Gunn; Cities Service Oil Company

[57] ABSTRACT

Precipitated silica pigments are pelletized employing from about 0.25 to about 3.0 percent by weight of a surface active agent as a binding agent. The bulk density of the silica is thereby increased, and by means of these pellets the silica can be incorporated into rubber much faster and with greatly reduced fly-loss.

3 Claims, No Drawings

PELLETS OF PRECIPITATED SILICA

This application is a division of United States patent application Ser. No. 887,403 filed on Dec. 22, 1969, now U.S. Pat. No. 3,646,183, and assigned to the same assignee as this application.

BACKGROUND OF THE INVENTION

This invention relates to precipitated silica pigments and more particularly relates to pellets formed by aggregating the particles of such pigments by means of a binding agent.

Precipitated silicas are produced by reacting an acid with an alkali metal silicate to form a precipitate of finely divided particles of silicon dioxide. The process is very carefully controlled. so that the silicas thus produced have particular and especially desirable physical and surface-chemical properties. After formation, the silica precipitate is washed for purification and is then dried to form a free-flowing powder. For use as a pigment in rubber, paper, paints, plastics, greases and the like, it is generally about 10 to 50 millimicrons and a surface area within the range of about 25 to 300 square meters per gram. As a consequence of these properties, the dry silica powder is very light and dusty, thus making it objectionable to handle, costly to ship, and difficult to incorporate into such materials as rubber.

Previous attempts to densify precipitated silica have involved the use of water or latex as an aggregating medium whereby the silica particles are wetted and bound together to form granules which are in turn dried. These granules are denser than the original powder and are less inclined to dust on use. They have not, however, proven altogether satisfactory since they are not always sufficiently friable for easy redispersion of the silica particles; and, in the case of a rubber binder, desirable that the silica have a particle size within the range of about 10 physical and chemical changes on aging and may contain a rubber which is not compatible with yet another rubber into which the silica is mixed. The rubber binder may also impart an undesirable color to the end-use product.

SUMMARY OF THE INVENTION

It is therefore an object of this invention to provide improved free-flowing pellets of precipitated silica.

Another object of this invention is to provide a method for increasing the bulk density of precipitated silica powder while preserving the dispersibility of the particles thereof.

Yet another object of this invention is to increase the rate at which precipitated silica can be incorporated into rubber.

Even another object of this invention is to reduce the fly-loss of silica when incorporating same into rubber.

Still another object of this invention is to provide a pelletized precipitated silica that is friable and thus easily dispersable in rubber.

Another object of this invention is to provide precipitated silica pellets which are aggregated with a binding agent that is compatible with a rubber into which the silica is dispersed.

Other objects and advantages of the invention will become apparent from the following description and the appended claims.

Dry, free-flowing pellets of precipitated silica are produced by aggregating the silica particles with from about 0.25 to about 3.0 parts by weight of a surface active agent which serves as a binder for holding the particles together in the pellet. Accordingly, the pellets are friable, i.e., they are easily crumbled and pulverized when masticated with rubber or ground with another material in which it is desirable to incorporate the silica. As a consequence, the silica particles in the pellets can be readily redispersed in order to achieve miximum benefit of the properties imparted to a compound by the silica. Furthermore, the bulk density of the silica is substantially increased by the pelletization, i.e., the density can be raised, for example, about 20–100 percent over the dry, parent powder from which the pellets are formed. More specifically, the bulk density of the pellets can be within range of about 12 to about 20 pounds per cubic foot.

The pellets of the present invention are also characterized by good mass strength and crushing strength properties, and this is important since the pellets must be strong enough to avoid pulverization during shipment while also being friable enough for easy pulverization and redispersion of the particles. Mass strength, which is determined in accordance with ASTM D1937-62T, provides a measure of how well the pellets will hold up when handled and shipped en masse. Crushing strength is a measurement of the force in grams required to crush individual pellets, and an indication of how easy or difficult it will be to crumble and pulverize the pellet for redispersion of the silica particles. Ideally, the mass strength should not be less than about 30 pounds and the crushing strength should not exceed about 25 grams. In accordance with the present invention, the pellets have a mass strength of about 30 to about 70 pounds and a crushing strength of about 5 to about 25 grams.

In producing the pellets, the particles of the precipitated silica can first be coated with a liquid surface active agent, and these coated particles can then be tumbled to form the pellets. More specifically, an aqueous solution of the surface active agent can be mixed with the silica particles to form pasty, wet pellets of the particles, and these wet pellets can then be dried at conditions which evaporate a substantial portion of the water, but without substantial vaporization or decomposition of the surface active agent. Accordingly, dry pellets can be recovered wherein the surface active agent is the binder.

In the practice of the invention, particles of the precipitated silica can be coated with an aqueous solution of the surface active agent, whereby the weight ratio of silica to solution in the resultant mixture is within the range of about 1/1.5 to about 1/2.5, and wherein the solution contains from about 0.25 to about 3.0 percent by weight of the surface active agent based on the weight of the silica in the mixture. This mixture can then be tumbled in a drum, for instance, or else the coated particles can be tumbled by vigorous stirring with agitating members, as is well known in the pelletizing art. By thus tumbling the coated particles, wet pellets are formed which can then be dried to produce dry pellets, e.g. pellets having a moisture content of one to three percent by weight, exclusive of any water of hydration contained by the silica.

Although the pellets can be dried in any preferrable manner which preserves the integrity thereof and the content of surface active agent therein, there is advantage to the use of static bed drying, e.g. tray drying, since there is little or no tendency toward self-destruction of the pellets as is experienced in moving bed techniques such as exist in a rotary drier, for instance.

Surface active agents which can be employed with the invention can be selected from a great variety of cationic, anionic and non-ionic surfactants which are either normally liquid or which can be converted to liquid by dissolution in a solvent. Accordingly, agents can be selected which do not impart objectionable side reactions, color, odor or the like to materials in which the agent is incorporated. Surface active agents which have been used to advantage in the practice of the invention include a triethanolamine salt of dodecyl benzene sulfonic acid (anionic), polyethylene glycol (nonionic), and dialkyl dimethyl ammonium bromide (cationic).

It will be understood that in forming a mixture of the silica particles and an aqueous solution of a surface active agent, either dry powdered silica or an aqueous slurry thereof can be employed. In other words, a solution of the agent can be made up and added to the dry powder or else the agent can be added to a mixture which comprises silica and water in proportions suitable for the formation of pellets. In the latter case, the surface active agent can be added during the silica manufacturing process after washing and partial dewatering of the precipitate. The pelletizing and drying steps can then follow subsequently.

It will also be understood that the term "precipitated silica" as used herein is intended to mean hydrated precipitated silicon dioxide, dehydrated precipitated silica, precipitated calcium silicate, mixtures thereof, and other varients of precipitated silica.

DESCRIPTION OF THE PREFERRED EMBODIMENTS

Four-400 gm. lots of a silica having a particle size of 22 millimicrons and a surface area of 150 square meters per gram were pelletized using the following aqueous media as a wet pelletizing agent:

Agent A-680 gms. of water

Agent B-672 gms. of water and 8 grams of triethanolamine salt of dodecyl benzene sulfonic acid Agent C-672 gms. of water and 8 gms. of dialkyl dimethyl ammonium bromide Agent D-672 gms. of water and 8 gms. of polyethylene glycol.

MIXING AND PELLETIZING PROCEDURES

1. The silica was placed in the bowl of a Hobart Mixer and the beaters were turned on to a moderate speed.

2. All of the solution of the surfactant or the water was slowly added to the mixer bowl.

3. Agitation was continued until the liquid was completely taken up by the silica and the wet pellets became relatively uniform in size.

4. The wet pellets were then poured into a pan and dried in an oven at 212° F. for 16 hours. The resultant dry pellets contained less than 1 percent free moisture.

PROPERTIES OF THE DRIED PELLETS

| Beading Agent | Parent Powder | A | B | C | D |
|---|---|---|---|---|---|
| Bulk Density, pounds/ft³ | 9.8 | 15.9 | 12.0 | 14.2 | 14.5 |
| Crushing Strength, grams | — | 19.5 | 5.7 | 8.2 | 13.9 |
| Mass Strength, pounds | —74 | 62 | 72 | 72 | |

COMPOUNDING INTO RUBBER

Silica pellets produced with the four Agents A–D, as well as the parent silica powder, were compounded into rubber along with other ingredients as follows:

| | Compound 1 | 2 | 3 | 4 | 5 |
|---|---|---|---|---|---|
| SBR-1507 | 100 | 100 | 100 | 100 | 100 |
| FEF Carbon Black | 2 | 2 | 2 | 2 | 2 |
| Antioxidant 2246[1] | 1 | 1 | 1 | 1 | 1 |
| Cumar RH[5] | 10 | 10 | 10 | 10 | 10 |
| Zinc Oxide | 1 | 1 | 1 | 1 | 1 |
| Retarder PD[2] | 0.75 | 0.75 | 0.75 | 0.75 | 0.75 |
| Circosol 42 X H[3] | 8 | 8 | 8 | 8 | 8 |
| Triethanolamine | 1 | 1 | 1 | 1 | 1 |
| DOTG | 1.5 | 1.5 | 1.5 | 1.5 | 1.5 |
| Santocure NS[4] | 0.75 | 0.75 | 0.75 | 0.75 | 0.75 |
| Sulfur | 3.0 | 3.0 | 3.0 | 3.0 | 3.0 |
| Parent silica powder | 50 | — | — | — | — |
| Silica pellets with Agent A | — | 50 | — | — | — |
| Silica pellets with Agent B | — | — | 50 | — | — |
| Silica pellets with Agent C | — | — | — | 50 | — |
| Silica pellets with Agent D | — | — | — | — | 50 |

[1]Antioxidant, American Cyanamid Co.
[2]Retarder and anti-scorch agent, American Cyanamid Company
[3]Naphthenic oil and processing aid, Sun Oil Company
[4]Accelerator, Monsanto Company
[5]Coumarone-indene resin, Allied Chemical Co.

RUBBER PROPERTIES

| Stress-Strain (293°F.) | Compound 1 | 2 | 3 | 4 | 5 |
|---|---|---|---|---|---|
| 60' L-300 | 610 | 580 | 720 | 580 | 600 |
| Tensile | 2530 | 2680 | 2940 | 2790 | 3040 |
| Elong. | 680 | 690 | 670 | 680 | 730 |
| S.H. | 55 | 57 | 57 | 54 | 55 |
| Max. Tensile | 2530 | 2680 | 2940 | 2790 | 3040 |
| Mooney Scorch at 284°F. | | | | | |
| TMV+5 | 11.8 | 12.4 | 12.0 | 11.6 | 10.5 |
| TMV+35 | 13.6 | 14.5 | 13.9 | 13.4 | 12.0 |

From the stress-strain data it is apparent that the pellets having a surface active agent as a binder developed improved reinforcing characteristics as measured by increased tensile strength. The scorch characteristic of the compounds containing pelletized silica were not significantly different from the control, Compound 1, which was produced from the powdered parent silica.

While the present invention has been described with reference to particular materials, formulations, process conditions and the like, it will be understood that still others may be employed without departing from the spirit and scope of the invention as expressed in the appended claims.

I claim:

1. Dry, friable, freely-flowing pellets of a precipitated silica pigment which contain about 0.25 to about 3 weight percent of a triethanol amine salt of dodecyl benzene sulfonic acid surface active agent and have a bulk density within the range of about 12 to about 20 pounds per cubic foot, a crushing strength within the range of about 5 to about 25 grams and a mass strength within the range of about 30 to about 70 pounds.

2. Dry, friable, freely-flowing pellets of a precipitated silica pigment which contain about 0.25 to about 3 weight percent of a dialkyl ammonium bromide surface active agent and have a bulk density within the range of about 12 to about 20 pounds per cubic foot, a crushing strength within the range of about 5 to about 25 grams and a mass strength within the range of about 30 to about 70 pounds.

3. Dry, friable, freely-flowing pellets of a precipitated silica pigment which contain about 0.25 to about 3 weight percent of a polyethylene glycol surface active agent and have a bulk density within the range of about 12 to about 20 pounds per cubic foot, a crushing strength within the range of about 5 to about 25 grams and a mass strength within the range of about 30 to about 70 pounds.

* * * * *